Patented Dec. 31, 1935

2,025,915

UNITED STATES PATENT OFFICE 2,025,915

FERTILIZER METHOD

Heinrich Tramm, Oberhausen-Holten, Germany, assignor to Ruhrchemie Aktiengesellschaft, Oberhausen-Holten, Germany No Drawing. Application February 11, 1931, Serial No. 515,124. In Germany February 17, 1930

3 Claims. (Cl. 71—9)

The advantage of using ammonium nitrate as one of the components of fertilizers is known. It contains the nitrogen which is indispensible to plant life in the form of the quick-acting nitrate component and of the ammonia which has a slower action. The use of ammonium nitrate without any admixture, as also in the form of mixed and unmixed fertilizers, is hindered by the strong attraction of the salt for water. Even when the moisture content of the air is low the mixtures begin to deliquesce. The property of ammonium nitrate of forming in admixture with other salts in the presence of small quantities of moisture, mixtures which lead to extremely great hardening of the mixed fertilizers while giving off its water and at the same time changing temperature and moisture, is particularly annoying.

Very many methods have been proposed for making mixtures of fertilizer salts containing ammonium nitrate in a form suitable for storage and distribution, but hitherto no satisfactory results have been obtained. To obtain such a fertilizer containing ammonium nitrate it is important that the ammonium nitrate shall during production be submitted to a particular reaction which removes as far as possible the influence of the atmospheric moisture on the finished fertilizer mixture. This reaction may be based upon a more or less thorough chemical conversion of the ammonium nitrate introduced. It may however be induced by influences which are mainly physical or physico-chemical. In this case care must be taken to reduce substantially the injurious effects of the atmospheric moisture upon the ammonium nitrate, or to remove them almost entirely, by forming double salts, enwrapping the particles of ammonium nitrate with other components of the finished mixture, uniting the components, and in other ways.

Mixed and unmixed fertilizers which contain ammonium and nitrate nitrogen and which are suitable for storage and distribution can be prepared by the processes hereinafter described. Such fertilizers are particularly suitable for the production of mixtures which at the same time have any desired content of ammonium phosphates. Mixed and unmixed fertilizers which are prepared by the use of ammonium nitrate and ammonium phosphates can be produced practically in any proportion in which the different kinds of earth require the two important fertilizer components nitrogen and phosphorus. They contain phosphorus in an easily assimilable form. If, moreover, potassium salts are incorporated into such fertilizers, the earth may be fertilized with the three most important fertilizer components in the necessary proportions.

It is a very simple matter to produce such mixed and unmixed fertilizers by producing one or more of the important constituents—that is to say, one or more ammonium salts—in the presence of solid substances; the reaction is advantageously carried on in such manner that the finished mixture is produced when the reaction has run its course. Among the solid substances that may be used are inert substances or advantageously fertilizer salts or mixtures of fertilizer salts; moreover mixtures of inert substances and fertilizer salts may be used.

The production of mixed and unmixed fertilizers in the presence of solid substances has the following advantages. The method consists in producing one or more of the constituents of the finished mixture in the presence of other components. At the same time the newly formed components may be at once decomposed with other parts of the mixture; on the other hand where atmospheric moisture is absorbed during storage, constituents of the finished mixture may be gradually decomposed. As ammonium salts are produced in similar processes, wherein considerable heat is liberated during their production, the presence of solid substances ensures a good distribution of the suddenly liberated heat of reaction. As the solid substances selected are principally in the form of coarse grains whose melting and mollifying point is considerably above room temperatures, the granular condition is left unaffected by the heat of reaction. Consequently they may form nuclei for the newly formed compounds. The constituents of the mixed and unmixed fertilizers are intimately combined, so that the most favourable conditions are provided for obtaining a coarse grained product which can be not only suitable for storing but also distribution.

It has been found particularly advantageous to pass a strong stream mainly of gaseous ammonia over the mixture for controlling its temperature, during or immediately after the reaction. For example, the mixed and unmixed fertilizers are produced in the use of an ammoniacal solution of ammonium nitrate. If a strong stream of ammonia be passed over the mixture during or immediately after the reaction, practically all the water present is vaporized without the content of ammonia in the finished product being reduced. It is not essential for there to be no water in the stream of ammonia but it may contain comparatively large quantities of water below the saturation point. The process is particularly useful for the production of mixed and unmixed fertilizers containing compounds of ammonium which readily dissociate in a form which is free from or containing water. Thus it is particularly suitable for compounds containing ammonium phosphate. The ammonia employed for conversion may be used for the most diverse purposes. For example, it is employed for producing ammonium salts by the saturation method, there being practically no disadvantage in the presence of water in the ammonia. Mixed and unmixed fertilizers can be produced by the process of the invention in the use of an excess of ammonia in liquid form. The use of an excess of ammonia in liquid form has the special advantage that much heat is absorbed by the evaporation of the ammonia.

The mixed and unmixed fertilizers are especially produced in the presence of solid substances in the use of a solid or liquid solution of ammonium nitrate in ammonia. The ammoniacal additional products of the ammonium nitrate in a form containing or free from water are combined with acids, acid anhydrides or acid salts containing or free from water. Strong heating causes all the water or a considerable part of it to vaporize while at the same time the ammonia combines with the acid components. The presence of the solid substances causes the ammonium nitrate to separate out in a form in which it is practically free from defects with respect to its capacity for storing and distribution. The products may be then dried for the removal of the residual water.

The solid substances used in this reaction may be inert substances or salts generally. In the latter case compounds may be added which have no reaction with the remaining constituents of the reaction mixture or the compounds may be those which can react. Preferably substances are employed which also have a fertilizing action. Accordingly the reaction is carried out, for example, in the presence of potassium salts, such as potassium nitrate, potassium chloride, potassium sulphate and other potassium salts. Treated or untreated phosphates, as well as any other substances known to be fertilizers, may however be used. Mixed and unmixed fertilizers containing ammonium phosphate may be produced in simple manner by mixing ammoniacal solutions of ammonium nitrate with phosphoric acid in suitable proportions. By this means mixed fertilizers may be produced which contain variable quantities of ammonia per unit of phosphoric acid. Mixtures of ammonium nitrate with other ammonium salts, may however, be produced if required in admixture with various ammonium salts. Thus by adding the solution referred to to sulphuric acid, mixed fertilizers are produced containing ammonium nitrate and ammonium sulphate, while by adding it to a mixture of sulphuric acid and phosphoric acid mixed fertilizers are produced containing ammonium sulphate, ammonium phosphate and ammonium nitrate. By using potassium hydrogen sulphate, mixed fertilizers are produced containing ammonium nitrate, ammonium sulphate and potassium sulphate.

The following are examples of mixed fertilizers which have been produced by the process of the invention.

(1) About 6 kg. of ammonia are absorbed by 36.2 kg. of ammonium nitrate; the product is allowed to react on a mixture of 33.4 kg. of 70% by weight of phosphoric acid and 36.4 kg. of potassium chloride; about 111 kg. of a mixed fertilizer are obtained having the following composition:

| | Per cent |
|---|---|
| KCl | 32.7 |
| $(NH_4)_2HPO_4$ | 8.5 |
| $(NH_4)H_2PO_4$ | 17.4 |
| $NH_4NO_3$ | 32.4 |
| $H_2O$ | 9.0 |

The nutrients are 14.9% N, 14.9% of $P_2O_5$ and 20.2% of $K_2O$. The excess ammonia is fed into sulphuric acid to produce ammonium sulphate. The water may be entirely or partially removed by drying in known apparatus.

(2) About 6 kg. of ammonia are added to 24.6 kg. of ammonium nitrate, the mixture being at the same time well cooled, the pasty products being added to a mixture of 16.25 kg. of 85% phosphoric acid, and 53.6 kg. of potassium nitrate; the 99.2 kg. of salt mixture produced has the following composition:

| | Per cent |
|---|---|
| $KNO_3$ | 54.0 |
| $(NH_4)_2HPO_4$ | 18.7 |
| $NH_4NO_3$ | 24.8 |
| $H_2O$ | 2.5 |

The nutrients are 20.2% of N, 10.1% of $P_2O_5$, and 25.2% of $K_2O$. The excess ammonia is employed for producing ammonium nitrate from nitric acid and ammonia.

(3) 31.6 kg. of diammonium phosphate are mixed with 26.9 kg. of potassium chloride and 12 kg. of 75% sulphuric acid, the mixture being stirred in a suitable agitator; the pasty mixture has then added to it the product obtained by adding about 5 kg. of ammonia to 22.1 kg. of ammonium nitrate. The product is a salt having the following composition:

| | Per cent |
|---|---|
| KCl | 28.1 |
| $(NH_4)_2HPO_4$ | 33.0 |
| $(NH_4)_2SO_4$ | 12.7 |
| $NH_4NO_3$ | 23.1 |
| $H_2O$ | 3.1 |

The nutrients are 17.8% of N, 17.8% of $P_2O_5$ and 17.8% of $K_2O$. The excess ammonia is fed into water to produce ammoniacal liquor.

25 kg. of ammonia free from water is absorbed by 100 kg. of ammonium nitrate. The mixture is added continuously to 100 kg. of 75% sulphuric acid, which is mixed with 100 kg. of clay; the mixture is stirred all the time. The heat of reaction causes the water introduced to vaporize. At once 300 kg. of an air dried mixture of ammonium nitrate and ammonium sulphate are obtained containing 100 kg. of clay thoroughly mixed.

In some cases the reaction proceeds more smoothly if the solution (containing or free from water) of ammonium nitrate in ammonia has in turn solid substances added to it. Not only may compounds be added in which there is no reaction with the remaining constituents of the reaction mixture, but also compounds with which reaction is possible. It is preferable to use the solution of ammonium nitrate in admixture with substances which have at the same time a fertilizing action. Thus for example, potassium salts, phosphates, salts containing nitrogen or other substances having such a reaction are used. Such mixtures of solid substances with ammoniacal solutions of ammonium nitrate can be produced by mixing solid substances with the finished solution. They may, however, be produced by treating with ammonia ammonium nitrate more or less intimately mixed with any suitable solid substance.

It has hereinbefore been mentioned that according to the invention the solid substances employed may be potassium salts. The use of potassium salts has the advantage that the final product includes a valuable fertilizer component. Furthermore potassium salts are compounds which have a high melting point and whose physical structure can scarcely be changed even if subjected to strong local overheating. It is preferable to use potassium salts in the form of coarse grains. The grains of the potassium compound then form in some measure crystal nuclei for the new compound which is precipitated upon the potassium salts present, assuming the form desired. The particles of the potassium salts may break up; but in every case where the potassium salts decompose a form of the finished product is obtained which is particularly suitable for storing and distribution.

The decomposition may be carried out for example in rotary drums or any other suitable apparatus. The danger of pockets being formed is very small, because the known practical measures employed render it easily possible for all the particles of the potassium salts or of the mixture of potassium salts to be brought into uniform contact with the reaction mixture. Consequently no lumps or the like appear which have a great affinity for water at different points by reason of insufficient mixing. Potassium compounds may be used in such manner that the potassium salt is, if required, more or less intimately mixed previously with the component or components to be added to the mixture.

To produce mixed and unmixed fertilizers containing both ammonium nitrate and ammonium phosphate, ammonium nitrate may be taken and mixed with other components, phosphoric acid and ammonia being added to the mixture together or in succession. Potassium salts, ammonium nitrate and phosphoric acid for example are mixed to form a paste in as homogeneous a condition as possible, and ammonia is allowed to react on the mixture. The ammonia may be in concentrated form or in solution for the reaction, and phosphoric acid may be added in more or less concentrated form. The degree of concentration of the components to the reaction is advantageously such that in every case only sufficient water is present as will cause the main part or all of the water introduced into the reaction to evaporate under the heat of reaction or of the solution. It is preferable that the quantity of water in the mixture of potassium salts, ammonium nitrate and phosphoric acid should be such that the greater part of the potassium salts in the mixture are in solid form. Thus, solid potassium salts act as solidifying nuclei for the whole mixture.

To produce the mixed fertilizers a mixture is taken of potassium salts and ammonium nitrate in a dry condition or containing water, or a mixture in which the larger part or the whole of the original components are dissolved and ammonia and phosphoric acid are added to the original mixture either together or in succession in either order, or both procedures may be adopted. Here again the water introduced into the reaction is of such quantity that the greater part of the water or all of it is practically vaporized by the reaction and solution heat of the reacting components. The use of potassium salts in solid form produces the special advantages hereinbefore referred to.

Mixed and unmixed fertilizers may be produced by forming ammonium nitrate, and ammonium phosphate at the same time, similar to a saturating process. The separation of the two salts likewise produces mixed and unmixed fertilizers particularly suitable for storing and distribution. Ammonium nitrate and ammonium phosphate may be formed together in the presence of other substances preferably salts, the substances present being at the same time used in solution or in solid form.

I claim:

1. A process for producing mixed salts which contain ammonium nitrogen and nitrate nitrogen and in the production of which considerable heat is liberated by the reaction of ammonia with acid components, consisting in adding ammoniacal solutions of ammonium nitrate, in which the ammonia acts as a solvent, to mixtures of acids with other granular substances until substantial neutralization of the ammonia which acts as a solvent is secured, and in controlling the temperature of the reaction by passing over the reacting mixture a strong current of ammonia.

2. A process for producing mixed salts which contain ammonium nitrogen and nitrate nitrogen and in the production of which considerable heat is liberated by the reaction of ammonia with acid components, consisting in adding ammoniacal solutions of ammonium nitrate, in which the ammonia acts as a solvent, to mixtures of acids with other granular fertilizing substances until substantial neutralization of the ammonia which acts as a solvent is secured, and in controlling the temperature of the reaction by passing over the reacting mixture a strong current of ammonia containing water.

3. A process for producing salts which contain ammonium nitrogen and nitrate nitrogen and in the production of which considerable heat is liberated by the reaction of ammonia with acid components, consisting in adding ammoniacal solutions of ammonium nitrate, in which the ammonia acts as a solvent to mixtures of acids with other granular substances until substantial neutralization of the ammonia which acts as a solvent is secured, and in controlling the temperature of the reaction by passing over the reacting mixture a strong current of ammonia admixed with other gases.

HEINRICH TRAMM.